United States Patent [19]
Stölzer

[11] Patent Number: 5,927,176
[45] Date of Patent: Jul. 27, 1999

[54] AXIAL PISTON MACHINE WITH TRANSVERSE AND ROTARY ADJUSTMENT OF THE PIVOTING CRADLE

[75] Inventor: Rainer Stölzer, Neu-Ulm, Germany

[73] Assignee: Hydromatik GmbH, Elchingen, Germany

[21] Appl. No.: 08/973,217

[22] PCT Filed: Aug. 12, 1996

[86] PCT No.: PCT/EP96/03561

§ 371 Date: Dec. 4, 1997

§ 102(e) Date: Dec. 4, 1997

[87] PCT Pub. No.: WO97/14888

PCT Pub. Date: Apr. 24, 1997

[30] Foreign Application Priority Data

Oct. 18, 1995 [DE] Germany .......................... 195 38 835

[51] Int. Cl.⁶ ............................... F01B 3/00; F01B 13/04
[52] U.S. Cl. ............................................... 92/12.2; 91/505
[58] Field of Search ............................. 92/12.2; 91/505, 91/506

[56] References Cited

U.S. PATENT DOCUMENTS

| | | |
|---|---|---|
| 3,739,691 | 6/1973 | Bobier . |
| 3,806,280 | 4/1974 | Bobier ...................................... 91/506 X |
| 3,967,541 | 7/1976 | Born et al. ................................ 92/12.2 |
| 4,269,574 | 5/1981 | Bobier . |
| 5,456,068 | 10/1995 | Ishii et al. ............................ 92/12.2 X |

FOREIGN PATENT DOCUMENTS

| | | |
|---|---|---|
| 2521312 | 7/1976 | Germany . |
| 2612270 | 2/1977 | Germany . |
| 2326597 | 4/1977 | Germany ................................. 91/506 |
| 3915904 | 3/1991 | Germany . |

*Primary Examiner*—John E. Ryznic
*Attorney, Agent, or Firm*—Scully, Scott, Murphy & Presser

[57] ABSTRACT

The invention relates to an axial piston machine of skew plate construction, the pistons (7, 8) of which are supported on a sliding surface (11), acting as a skew plate, of a cradle (12) pivotable about an axis (33). The pivoting angle of the cradle (12) can be adjusted by means of an adjusting device coupled to the cradle (12) via a coupling device (20). According to the invention, the coupling device (20) permits both coupling to a transverse adjustment (30) carrying out a translational adjustment movement and to a rotary adjustment carrying out a rotational adjustment movement. To this end, the coupling device (20) has a bolt element (34) located eccentrically offset in relation to the axis (33), which bolt element cooperates with a sliding element (32) for coupling to the translational adjustment movement and with an eccentric component connected to a rotary shaft (50) for the coupling of the rotational adjustment movement.

8 Claims, 3 Drawing Sheets

AXIAL PISTON MACHINE WITH TRANSVERSE AND ROTARY ADJUSTMENT OF THE PIVOTING CRADLE

The invention relates to an axial piston machine of skew plate construction, in accordance with the preamble of claim 1.

An axial piston machine of this kind of construction is known from DE-PS 39 15 904. The skew plate is configured as a pivotally mounted cradle, whereby the pistons are supported upon the sliding surface of the cradle. In order to vary the pivot angle of the cradle, an adjustment device is provided which engages on the cradle via a coupling device. Axial piston machines of this kind can be employed both as axial piston pumps and also as axial piston motors.

DE-PS 39 15 904 describes the adjustment of the cradle via a piston acted upon hydraulically and effecting a translational movement. The piston is coupled with the cradle via a sliding element, which is displaced by the piston in the direction of the piston stroke. Thereby, the sliding element is pivotally connected with the cradle by means of a bearing pin and engages into a groove formed in the piston. However, there are applications in which the pivoting of the cradle by means of a rotary movement is more advantageous. The coupling of the cradle to an adjustment device effecting a rotational adjustment movement requires, however, a different configuration of the coupling device.

The object of the invention is to provide a coupling device which makes possible both coupling to a translational adjustment movement and also to a rotational adjustment movement.

The object is achieved by means of the characterising features of claim 1 in combination with the features of the preamble.

The invention is based upon the insight that by means of a corresponding constructional configuration of the coupling device, by means of a bolt element offset eccentrically in relation to the pivot axis, both coupling to a sliding element for bringing about a translational adjustment movement and also a coupling to an eccentric element for bringing about a rotational adjustment movement is possible.

Claims 2 to 10 relate to advantageous developments of the invention.

Corresponding to claims 2 and 3, the bolt element may preferably be formed with cylindrical shape and be pivotally fixed at its outer diameter in a corresponding bore of the sliding element.

Further, the bolt element may preferably have a groove, in accordance with claim 4, into which the eccentric element can engage. In accordance with claim 5, the eccentric element may be formed in a particularly simple manner as a pin extending perpendicularly of the axis of rotation of the rotary shaft.

In accordance with claim 6, for the mounting of the cradle, as is in principle known from DE-PS 39 15 904 or DE-AS 25 21 312, there may be provided roller bearing elements guided in a cage. In order to avoid a displacement of the cage and the roller bearing elements guided therein, there must be provided a follow-up device. Corresponding to claims 7 to 10, the follow-up device can have a guide element which is mounted in the region of the bolt element. For this purpose, the bolt element may have a corresponding recess which, corresponding to claim 8, preferably undercuts the outer diameter of the bolt and thus makes possible a free pivoting movement of the guide element within the provided pivot angle range of the cradle.

Preferred exemplary embodiments of the invention will be described below in more detail with reference to the drawings, which show:

FIG. 1A a section through an exemplary embodiment of the invention having transverse adjustment, FIG. 1B a section along the line A—A in FIG. 1A, with the cradle in neutral position, FIG. 1C a section along the line A—A in FIG. 1A, with pivoted cradle, FIG. 2A a section through an exemplary embodiment of the invention having rotary adjustment, FIG. 2B a section along the line A—A in FIG. 2A, with the cradle in neutral position, FIG. 2C a section along the line A—A in FIG. 2A, with pivoted cradle, FIG. 3 a perspective illustration of the cradle with a coupling device in accordance with the invention, FIG. 4 an axial section through an axial piston machine with which the present invention can be employed.

First, with reference to FIG. 4, the basic construction of an axial piston machine, with which the present invention is employed, will be briefly described.

FIG. 4 shows an axial section through an axial piston machine of skew plate construction. The axial piston machine can work both as axial piston pump and also as axial piston motor. A cylinder drum 4 is connected with the drive shaft 1, which is mounted rotatably in bearing devices 2, 3, so that the cylinder drum rotates with the drive shaft. Cylinder bores 5 are formed, radially uniformly distributed, in the cylinder drum 4. The inflow and outflow of the pressure medium is effected through corresponding control openings in the control plate 6. Pistons 7, 8 are movably arranged in the cylinder bores 5 and bear, via slippers 9, 10, on the sliding surface 11 of a cradle 12 acting as skew plate.

The cradle 12 is formed, in substance, in the shape of a segment of a cylinder and at its convex outer surface 13 bears, by means of the roller bearing elements 14, on the concave outer surface 15 of a support block 16. The roller bearing elements 14 are, for their part, mounted in a cage 17 whereby it is ensured that the spacing of the roller bearing elements 14 always remains unchanged. By means of a follow-up device, still to be described and which can be seen from FIGS. 1 to 3, it is ensured that the cage 17, along with the roller bearing elements 14, is not progressively pushed laterally out of the gap 18 between the cradle 12 and the support block 16 as a consequence of the pivoting of the cradle 12. On one of the circular segment shaped outer surfaces 19 of the cradle 12 there is provided a coupling device 20 in accordance with the invention, in order to make possible the adjustment of the cradle 12 both by means of a transverse adjustment and also by means of a rotary adjustment. This will be described below with reference to FIGS. 1A to 1C, and 2A to 2C, in detail.

FIG. 1A shows a section through the axial piston machine in accordance with the invention, in the region of the cradle 12 in the case of coupling to an adjustment device which carries out a transverse adjustment in the form of a translational adjustment movement.

From FIG. 1A, the piston 7 can be recognized which is supported via the slipper 9 on the sliding surface 11 of the cradle 12. To adjust the setting angle of the cradle 12 there is provided a piston 30 which is movably guided in a cylinder—not shown—and is hydraulically adjustable. For bringing about the translational movement of the piston 30 into the cradle 12 so that the cradle 12 effects a pivoting movement around the pivot axis 33 lying outside the cradle 12, there is provided the coupling device 20 in accordance with the invention. Significant for the invention is thereby that the coupling device 20, with the same constructional conception, can be employed also for bringing about a rotational movement for adjustment of the cradle 12, which will be described in more detail with reference to FIGS. 2A to 2C. The coupling device 20 includes a bolt element 34 formed as part of or attached to the upper side of the cradle 12, which bolt element—in the exemplary embodiment according to FIG. 1A to 1C—has an exterior form in substance of cylindrical shape. The bolt element 34 engages, at its outer periphery, into a recess 35 of the sliding element 32—formed in the exemplary embodiment as a round bore—so that the sliding element 32 is mounted pivotally at the cradle 12 by means of the cooperation of the bolt element 34 and the recess 35. Thereby, the bolt element 34 is arranged eccentrically offset to the pivot axis 33 of the cradle 12.

The sliding element 32 is for its part pushed into a groove 31 of the piston 30 and is carried along by the piston 30 in the direction of the translational movement of the piston 30—which direction is perpendicular to the plane of the drawing. The sliding element 32 cooperates with the bolt element 34 in the manner of a crank and transfers the translational movement of the piston 30 to the cradle 12 in such a manner that the cradle carries out the intended pivoting movement. Thereby, as already described, the cradle 12 is mounted by means of roller bearing elements 14, whereby the roller bearing elements 14 are held together by the cage 17.

As can be better seen from the sectional representation along the line A—A of FIG. 1A, illustrated in FIG. 1B, for fixing the cage 17 together with the roller bearing elements 14 there is provided a follow up device 36, which on the housing side is mounted pivotally in a bearing element 37. The follow-up device 36 includes a guide element 38, formed bar-shaped, which is likewise pivotally mounted at a sleeve-shaped bearing element 39 on the cage 17.

Thereby, the bar-shaped guide element 38 can move freely both in the bearing 37 and also in the bearing 39 in its longitudinal direction. For receiving the guide element 38, the bolt-shaped element 34 has a recess 40 towards the roller bearing elements 14. In the region of the recess 40 there is provided a bore 41 in the cradle 12, in which the end of the bar-shaped guide element 38—in the exemplary embodiment angled at 90°—is pivotally mounted.

FIG. 1C shows the sectional representation corresponding to FIG. 1B, with the cradle 12 pivoted out. By means of this further development, the guide element 38 can be integrated into the coupling device 20, whereby the opening of the recess 40—as can be seen from FIG. 1C—is to be so chosen that the guide element 38 is freely moveable over the entire pivot angle range of the cradle 12.

FIGS. 2A to 2C show sectional illustrations corresponding to those of FIGS. 1A to 1C, but with coupling to a rotary adjustment, with which the adjustment device—not shown—exercises a rotational adjustment movement by means of the rotary shaft 50.

The components already described with reference to FIGS. 1A to 1C are provided with corresponding reference signs, so that in the following a description thereof is not necessary.

The adjustment device—not shown—exercises, via the rotary shaft 50, a torque on a pin 51 formed on the rotary shaft 50. The pin 51 extends radially from the rotary shaft 50 and engages into a corresponding groove 52, formed in the bolt element 34, which can be better seen from FIGS. 2B and 2C. The torque exercised by the rotary shaft 50 is thus transferred via the pin 51 and the bolt element 34 to the cradle 12, which then carries out the desired pivoting movement around the pivot axis 33 which coincides with the axis of rotation of the rotary shaft 50.

Figure 1A:
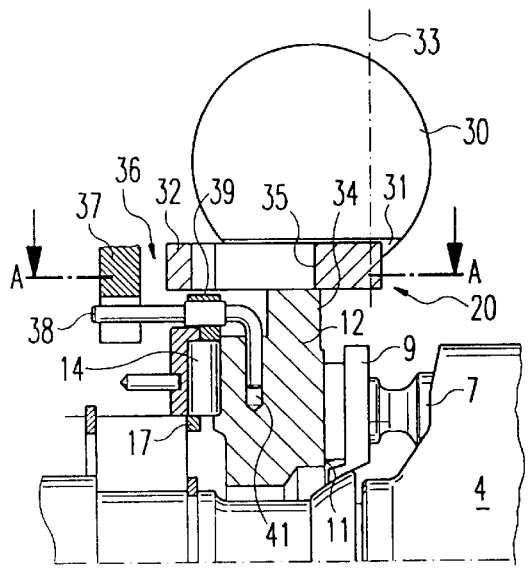
Figure 1B:
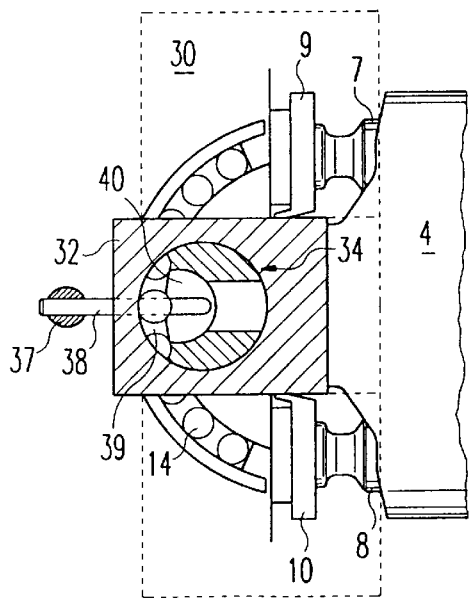
Figure 1C:
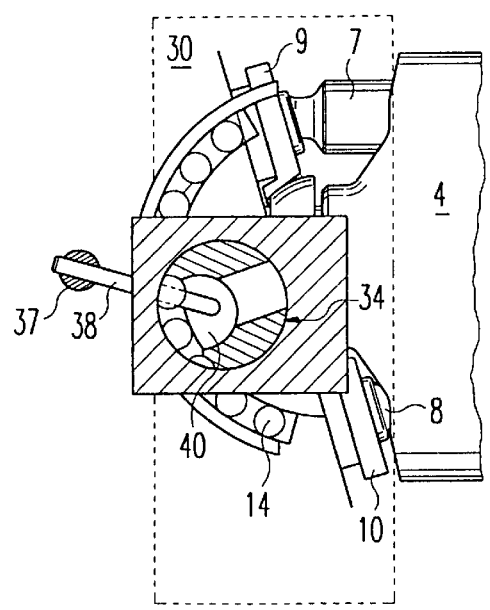
Figure 2A:
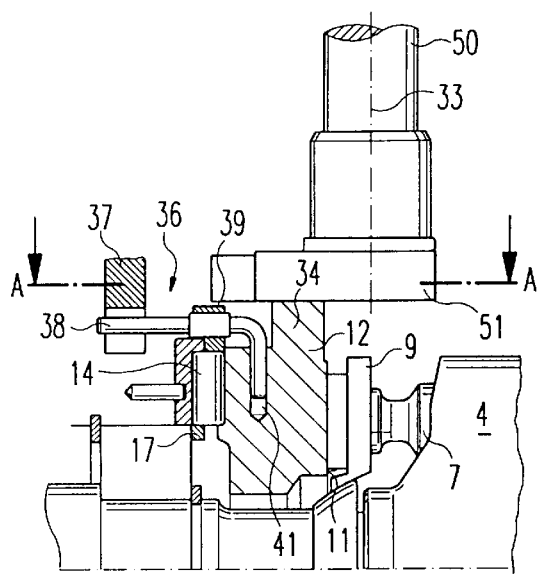
FIG. 2B shows a section along the line A—A in FIG. 2A, from which the configuration of the coupling device 20 in accordance with the invention is clearly apparent.
FIG. 2C shows the sectional illustration according to FIG. 2B, but with pivoted cradle 12.
Figure 2B:
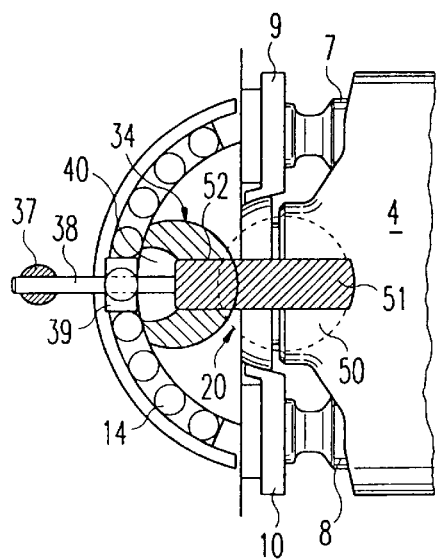
Figure 2C:
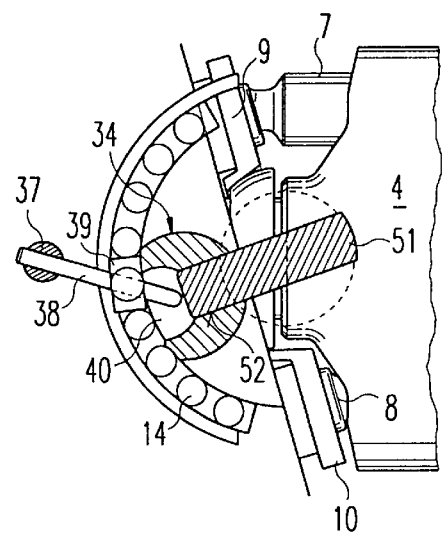

The advantages of the coupling device configured in accordance with the invention lie in the adaptability both to a transverse adjustment, as described with reference to FIGS. 1A to 1C, and to a rotary adjustment, as described with reference of FIGS. 2A to 2C. Thereby a large measure of flexibility is attained, in that a cradle 12 of uniform construction with uniformly constituted bolt elements 34 can be employed both with such axial piston machines for which a transverse adjustment is provided and also for such axial piston machines for which a rotary adjustment is provided. As a result of the increased quantities which can thereby attained, production costs are reduced. Further, for both versions, the inner contours of the housing can be kept small.

Figure 3:
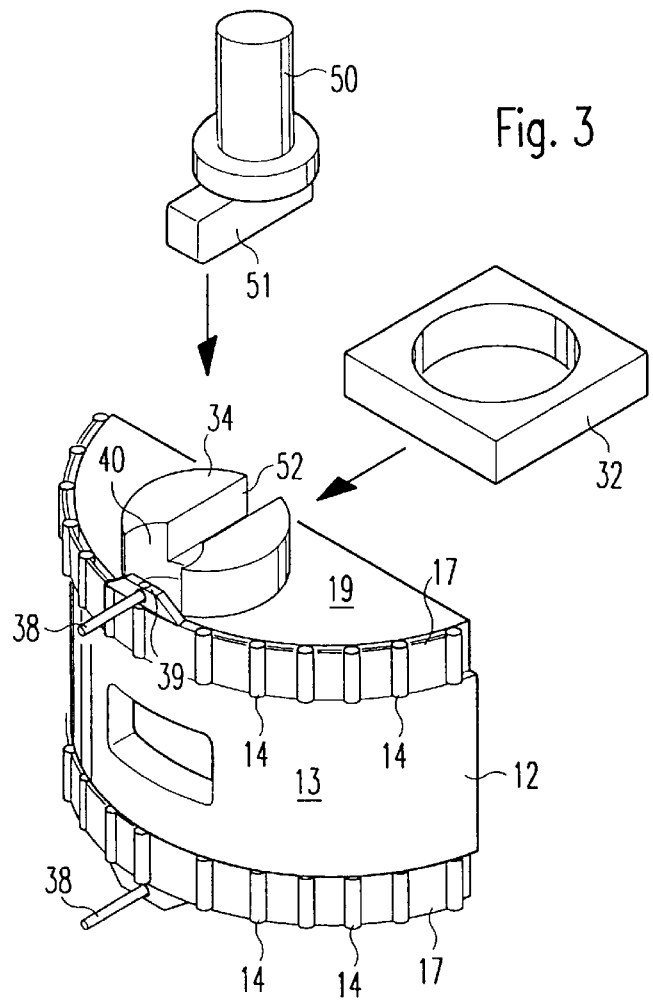
Figure 4:
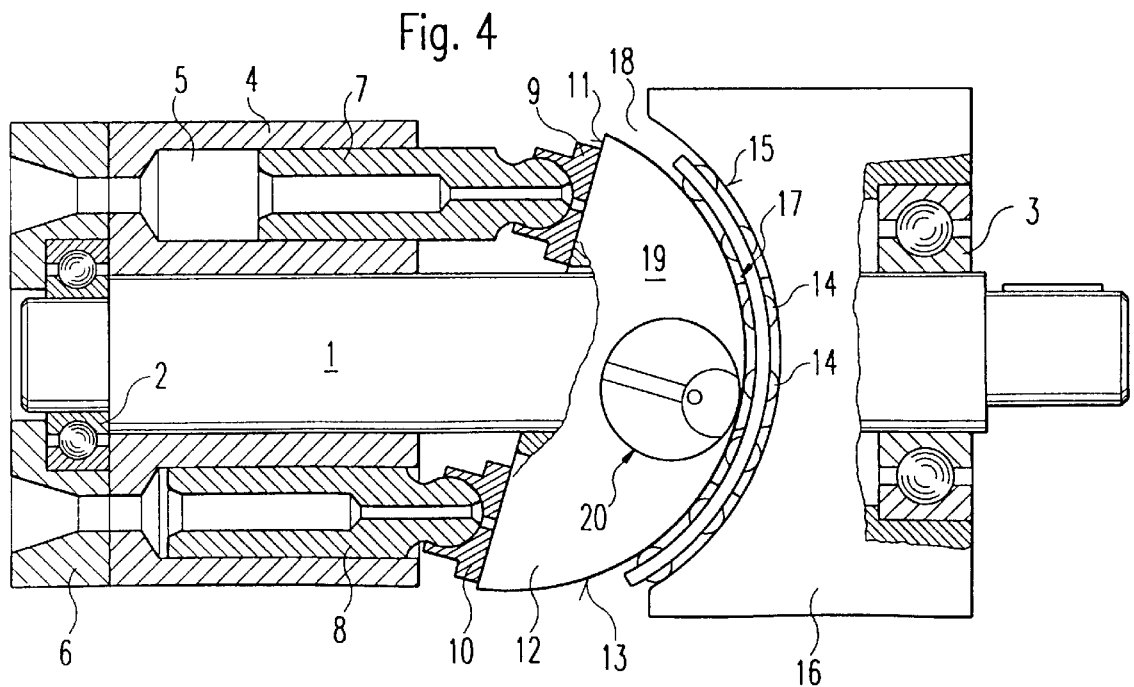

For better clarification of the invention, FIG. 3 shows in perspective illustration the cooperation of the bolt element 34 formed on the cradle 12 both with the sliding element 32 and with the pin 51 which is connected with the rotary shaft 50. The assembly is made clear by the corresponding arrows. Further, the recess 40 for receiving the bearing of the bar-like guide element 38 can be seen. For mounting the cradle 12 there are provided both at the upper and also at the lower ends of the convex surface 13, roller bearing elements 14 which are guided in the cages 17.

It is apparent that the present invention is not restricted to the illustrated and described exemplary embodiments. In particular, as a bearing, an hydraulic bearing can also be employed and the connection between the rotary shaft 50 and the bolt element 34 on the one hand and between the piston 30 and the bolt element 34 on the other hand can be effected with different manners of construction. Also, a bolt element 34 can be provided at both sides of the cradle 12, in order to be able to arrange the adjustment device selectively at each side of the cradle 12. Thereby, the flexibility is further improved.

I claim:

1. Axial piston machine of skew plate construction, the pistons (7, 8) of which are supported upon a sliding surface (11), acting as skew plate, of a cradle (12) pivotable around a pivot axis (33), the pivot angle of which is adjustable with an adjustment device coupled with the cradle (12) via a coupling device (20), whereby the coupling device (20) is formed both for coupling to an adjustment device (30) effecting a translational adjustment movement, and also for coupling to an adjustment device effecting a rotational adjustment movement, characterised in that, the coupling device (20) has a bolt element (34), eccentrically offset with regard to the pivot axis (33), which bolt element cooperates with a sliding member (32) for coupling to the translational adjustment movement, and cooperates with an eccentric element (51), connected with a rotary shaft (50), for coupling to a rotational adjustment movement, in that, for coupling to the translational adjustment movement, the bolt element engages into a recess (35) provided in the sliding element (32), and in that, for coupling to the rotational adjustment movement, the bolt element (34) has a groove (52) into which the eccentric element engages.

2. Axial piston machine according to claim 1, characterised in that, the bolt element (34) is formed with cylindrical shape and is pivotally fixed at its outer diameter on the sliding element

(32) by means of engagement into a round bore (35) of the sliding element (32) corresponding to the outer diameter.

3. Axial piston machine according to claim 1 or 2, characterised in that,
the eccentric element is formed as a pin (51) extending perpendicularly to the axis of rotation of the rotary shaft (50).

4. Axial piston machine according to claim 1, characterised in that,
there are provided, for mounting the cradle (12), roller bearing elements (14) guided in a cage (17) with a follow-up device (36) for fixing the relative disposition of the cage (17) in relation to the cradle (12).

5. Axial piston machine according to claim 4, characterised in that,
the follow-up device (36) has a guide element (38) which is guided in a recess (40) of the bolt element (34).

6. Axial piston machine according to claim 5, characterised in that,
the recess (40) undercuts the outer diameter of the bolt element (34) and makes accessible an opening for the engagement of the guide element (38).

7. Axial piston machine according to claim 6, characterised in that,
the recess (40) in the bolt element (34) is formed by a bore overlapping with the outer diameter of the bolt element.

8. Axial piston machine according to claim 5, characterised in that,
the guide element (38) is pivotally mounted in the recess (40) of the bolt element (34).

\* \* \* \* \*